US011291084B2

United States Patent
Dardona et al.

(10) Patent No.: US 11,291,084 B2
(45) Date of Patent: Mar. 29, 2022

(54) METHOD FOR ATTACHING BUS BAR TO CARBON ALLOTROPE DE-ICING SHEETS

(71) Applicant: Goodrich Corporation, Charlotte, NC (US)

(72) Inventors: Sameh Dardona, South Windsor, CT (US); Paul Sheedy, Bolton, CT (US); Wayde R. Schmidt, Pomfret Center, CT (US)

(73) Assignee: Goodrich Corporation, Charlotte, NC (US)

( * ) Notice: Subject to any disclaimer, the term of this patent is extended or adjusted under 35 U.S.C. 154(b) by 569 days.

(21) Appl. No.: 15/716,089

(22) Filed: Sep. 26, 2017

(65) Prior Publication Data

US 2019/0098702 A1    Mar. 28, 2019

(51) Int. Cl.
| | | |
|---|---|---|
| H05B 3/14 | (2006.01) | |
| H05B 3/03 | (2006.01) | |
| H05B 3/34 | (2006.01) | |
| C01B 32/168 | (2017.01) | |
| C01B 32/194 | (2017.01) | |
| C01B 32/21 | (2017.01) | |
| B64D 15/12 | (2006.01) | |

(52) U.S. Cl.
CPC ............ *H05B 3/145* (2013.01); *C01B 32/168* (2017.08); *C01B 32/194* (2017.08); *C01B 32/21* (2017.08); *H05B 3/03* (2013.01); *H05B 3/34* (2013.01); *B64D 15/12* (2013.01); *H05B 2203/011* (2013.01); *H05B 2203/013* (2013.01); *H05B 2203/017* (2013.01); *H05B 2214/04* (2013.01)

(58) Field of Classification Search
CPC ...... B64D 15/12; B64D 15/14; C01B 32/168; C01B 32/194; C01B 32/21; H05B 2203/011; H05B 2203/013; H05B 2203/017; H05B 2214/04; H05B 3/03; H05B 3/145; H05B 3/34
USPC ....... 219/541, 547, 548, 543, 504, 505, 129, 219/202, 137 R
See application file for complete search history.

(56) References Cited

U.S. PATENT DOCUMENTS

| | | | | |
|---|---|---|---|---|
| 4,000,026 A | * | 12/1976 | Rexer | .................... C04B 35/52 |
| | | | | 156/49 |
| 5,806,588 A | * | 9/1998 | Weeks, Jr. | ........... B23K 35/001 |
| | | | | 165/181 |
| 6,585,152 B2 | | 7/2003 | Farahmandi et al. | |
| 7,940,880 B2 | * | 5/2011 | Schedler | .................. G21B 1/13 |
| | | | | 376/100 |
| 7,964,447 B2 | | 6/2011 | Chrysler et al. | |
| 7,998,367 B2 | | 8/2011 | Khraishi et al. | |
| 2014/0151353 A1 | | 6/2014 | Steinwandel et al. | |
| 2014/0216942 A1 | | 8/2014 | Jiang et al. | |
| 2015/0053668 A1 | | 2/2015 | Decker et al. | |

(Continued)

OTHER PUBLICATIONS

Extended European Search Report for EP Application No. 18196284.6, dated Feb. 28, 2019, pp. 6.

*Primary Examiner* — Ibrahime A Abraham
*Assistant Examiner* — Elizabeth M Sims
(74) *Attorney, Agent, or Firm* — Kinney & Lange, P. A.

(57) ABSTRACT

A method of making a carbon allotrope heater element for ice protection includes imparting the heater element with a wetting layer, adding a metallic element, which is melted and wets the wetting layer such that a bus bar attachment is made on at least a portion of the carbon allotrope heater element.

11 Claims, 2 Drawing Sheets

(56) References Cited

U.S. PATENT DOCUMENTS

| | | | |
|---|---|---|---|
| 2015/0327334 A1* | 11/2015 | Choi | H05B 3/86 |
| | | | 219/203 |
| 2016/0221680 A1 | 8/2016 | Burton et al. | |
| 2016/0243636 A1* | 8/2016 | Longtin | B23K 35/302 |
| 2016/0372228 A1 | 12/2016 | She et al. | |
| 2017/0190579 A1* | 7/2017 | Cola | C01B 32/168 |
| 2017/0353996 A1* | 12/2017 | Lee | H05B 3/20 |

\* cited by examiner

METHOD FOR ATTACHING BUS BAR TO CARBON ALLOTROPE DE-ICING SHEETS

BACKGROUND

This application relates generally to aircraft ice protection, and specifically to de-icing sheets.

Exterior surfaces of aircraft are often subjected to ice formation, and anti-icing or de-icing devices must be used to remove or prevent ice from accumulating. Various types of ice protection systems have been developed to protect aircraft from the hazardous effects of icing. Electro-thermal de-icing systems typically use metal wires to resistively melt ice by converting electrical energy to thermal energy. The use of metal wires as resistance elements embedded in de-icing systems presents several problems, including element durability, parasitic weight, limited damage tolerance and low power efficiency.

Carbon nanotube (CNT) materials have been proposed as an alternative to metal wire or foil heating elements in ice protection systems. CNTs are carbon allotropes having a generally cylindrical nanostructure. They have unusual properties that make them valuable for many different technologies. For instance, some CNTs can have high thermal and electrical conductivity, making them suitable for replacing metal heating elements. Due to their much lighter mass, substituting CNTs for metal heating components can reduce the overall weight of a heating component significantly. This makes the use of CNTs of particular interest for applications where weight is critical, such as in aerospace and aviation technologies. However, sheets or films containing CNTs are difficult to connect to an electrical circuit. For instance, bus bar attachment to CNT sheets is quite difficult, as metallic bus bars do not wet to carbon allotropes. Thus, connecting metal wires, for example via soldering, to a CNT heater can be challenging.

Typical metal heating circuits are commonly created by photochemically etching metallic alloy foils on a substrate and subsequently building electrothermal heater composites. This method suffers from insufficient reliability due to over- or under-etching, photoresist alignment issues, and delamination, in addition to poor substrate adhesion. Additionally, this type of etching is time consuming, wasteful, and environmentally detrimental.

SUMMARY

A method of making a conformal coating on a carbon allotrope heater element includes applying a wetting agent to a portion of the carbon allotrope heater element to create a wetting layer, introducing a metallic material onto the portion of the carbon allotrope heater element with the wetting layer, and melting the metallic material such that it wets the portion of the carbon allotrope heater element with the wetting layer.

A carbon allotrope heater element includes a carbon allotrope material, and a metallic coating on a portion of the carbon allotrope material, the metallic coating bonded to the carbon allotrope material by a wetting layer.

DETAILED DESCRIPTION

Heating circuits are used for a variety of ice protection purposes. The use of carbon nanotubes and other types of carbon allotropes allows for tailored resistivity and increased power efficiency for ice protection applications. However, carbon nanotube heater elements are difficult to connect to bus bars for electrical connection to the de-icing circuit. Thus, this application presents a method of attaching metallic bus bars to carbon heater elements using a surface modification of the carbon allotrope, including a wetting layer.

Figure 1:
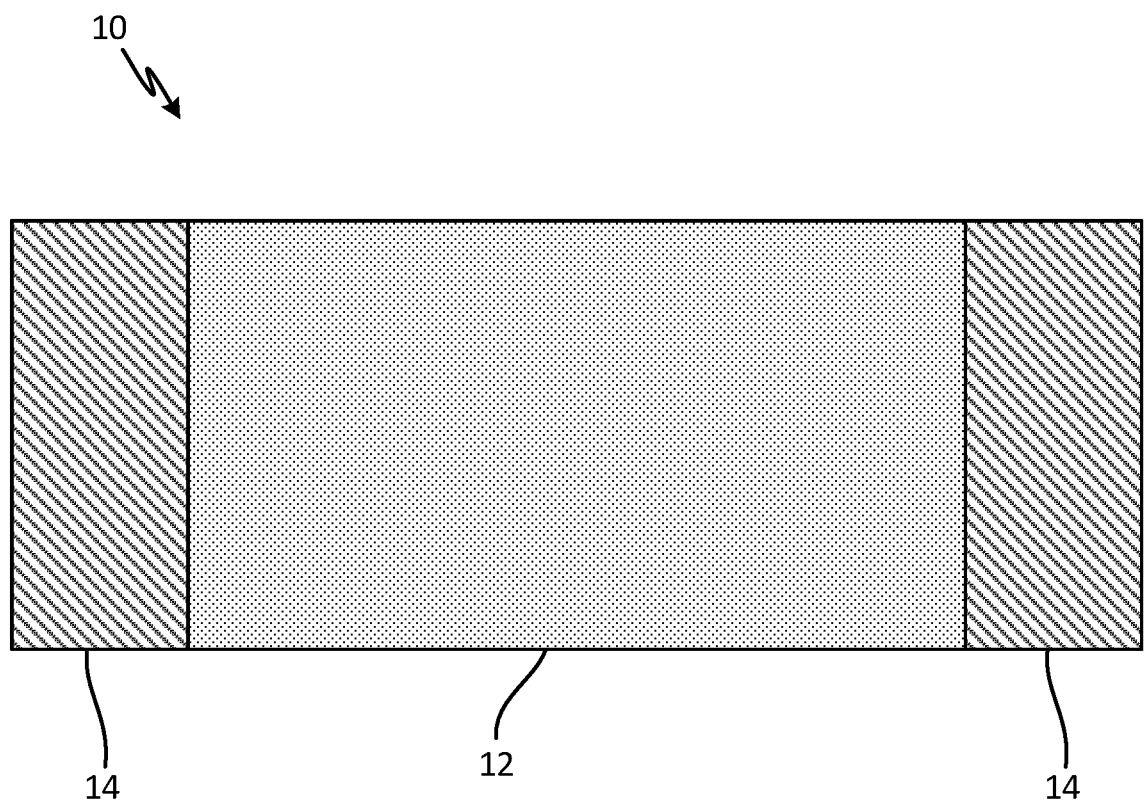
FIG. 1 is a schematic view of a carbon allotrope heater sheet with bus bar attachments.

FIG. 1 is a schematic view of a carbon allotrope heater sheet with bus bar attachments. Carbon allotrope heater sheet 10 includes main portion 12 and coated portions 14. Carbon allotrope heater sheet can be, for example, made of carbon nanotubes (CNT), and can be woven or non-woven, knitted, braided, self-assembled, vapor deposited, solution cast, planar or nonplanar, or three dimensional. Alternatively, sheet 10 can be made of a different carbon allotrope, including at least one of graphene, graphene nanoribbons (GNRs), graphite or other suitably conductive form of carbon. Other alternatives, such as boron nitride nanotubes, can be used.

Coated portions 14 allow for electrical connection to sheet 10. For instance, wires can be soldered onto coated portions 14. Coated portions 14 are comprised of a metallic material, such as copper or copper alloys, aluminum or aluminum alloys, nickel or its alloys, platinum or platinum alloys, silver or silver alloys, solder alloys, braze alloys, other suitably conductive metals or semimetals, or combinations thereof. Coated portions are applied to sheet 10 through a wetting layer capable of allowing at least partial infiltration or coating of sheet 10 by metallic material. The wetting layer can be comprised of $Mo_2C$, $TiC$, $NiO$, $Fe_2O_3$, $Cr_3C_2$, $WC$ or other suitable carbides, oxides, nitrides, elemental or alloyed metallic chemistries and combinations thereof. The wetting layer is applied to sheet 10 prior to the metallic material. The process of making sheet 10 with coated portions 14 is explained in reference to FIG. 2 below.

Figure 2:
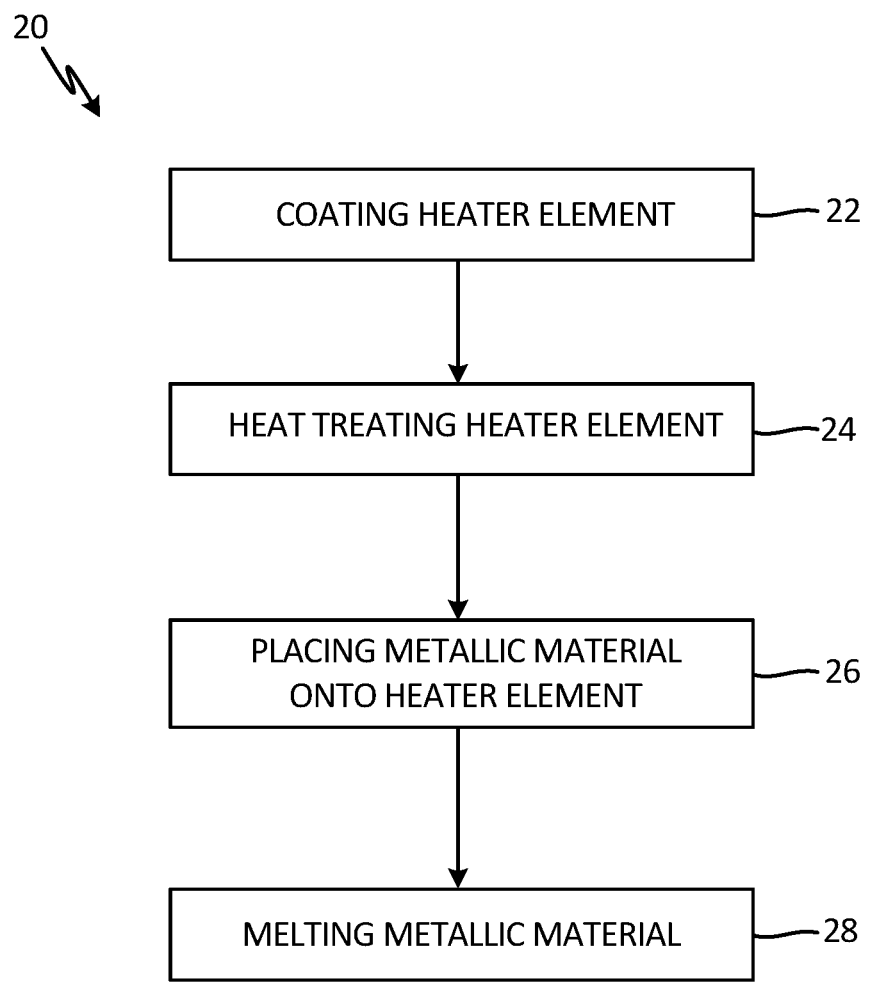
FIG. 2 is a flow chart depicting a method of making a carbon allotrope heater sheet with bus bar attachments.

FIG. 2 is a flow chart depicting a method of making a carbon allotrope heater sheet, such as a CNT heater sheet, with bus bar attachments. Method 20 (discussed in more detail below) includes coating a heater element (step 22), heat treating the heater element (step 24), placing a metallic material onto the heater element (26), and melting the metallic material (step 28). Method 20 in FIG. 2 results in an article such as heater sheet 10 of FIG. 1.

Method 20 starts with creating a wetting layer on a heater element in step 22. The heater element can be a carbon allotrope suitable for ice protection, such as carbon nanotubes, graphene, graphene nanoribbons (GNRs), graphite or other suitably conductive form of carbon. Alternatively, boron nitride nanotubes or similar material can be used. Depending on the specific application, heater elements can range widely in size from a few square centimeters to hundreds of square centimeters, for example, a heater can be less than one square inch, or a panel of 50 by 100 inches. The heater element can be a sheet that is woven or non-woven (as described in more detail with reference to FIG. 1), depending on its ultimate application for ice protection (e.g., what part of the aircraft it may be applied to and the ice protection needs of that part). In another example, the heater element can be a single wire, cable or ribbon structure, or bundles of such structures, comprising the carbon allotrope. Or, the heater element can be a three dimensional heater element, such as a heater element with varying thicknesses as required by the shape of a part needing ice protection (such as a heating element with varying thicknesses would have varying resistances as a function of thickness and/or shape).

A wetting layer is applied to the heater element in step 22. The wetting layer enables the infiltration or coating of a metallic layer into or onto at least a portion of the heater element. This allows for improved electrical contacts. The wetting layer can be $Mo_2C$, TiC, NiO, $Fe_2O_3$, $Cr_3C_2$, or other suitable carbides, oxides, nitrides, elemental or alloyed metallic chemistries and combinations thereof. Typically, the wetting layer ranges in thickness from a few atoms (about one nanometer) up to hundreds of microns. The wetting layer can be applied through slurry or vapor coating methods, including dip coating, painting, chemical vapor deposition (CVD), physical vapor deposition (PVD) and atomic layer deposition (ALD), direct writing methods, including screen printing, micro-extrusion or aerosol jet printing, or other suitable methods. In most instances, only a prescribed portion of the heater element is imparted with the wetting layer in order to create a local electrical connection, nominally ranging from about 5% to about 40% of the available surface area of the heater element. The size, shape and thickness of the imparted wetting layer can be tailored to match the configuration of the de-icing circuit which best serves the ice protection needs, with nominal thicknesses varying from just a monolayer to several microns. In some instances, an integral carbide wetting layer may be formed directly on the heater element material via reaction between a chemical precursor and the free surface of the heater element. Such integral carbides are then amenable to wetting with metallic elements, such as copper.

Optionally, the heater element imparted with wetting layer is heat treated in step 24. Depending on the selected wetting layer, the heater element with wetting layer may be sintered or heat treated. For instance, a sample carbon nanotube heater element with a $Mo_2C$ wetting layer can be, for example, heated to about 1400° C. for about 15 minutes in an argon environment. The specific requirements of step 24 depend on the materials selected for the heater element and the wetting layer. In some instances, step 24 may secure the wetting layer to the heater element prior to addition of a metallic layer that will allow for a bus bar connection. Additional environmental exposure (time, temperature, or atmosphere) in static or cyclic sequences can be used.

Subsequently, a metallic element is placed (or deposited) on the heater element in step 26. The metal, alloy, or metallic element or alloy precursor can be in the form of a foil, powder, wire, solution, vapor or other suitable form to result in the desired chemistry, and is placed on, in or sufficiently close to, the portion of the heater element that has the wetting layer. Typically, the metallic element can be between one and ten nanometers thick. The metallic element can be copper, copper alloys, nickel, nickel alloys, or other suitable metallic elements which would allow for an appropriate bus bar connection. Alternatively, a metallic paste, dispersion, or ink can be directly deposited onto the wetting layer or a molten metal may be directly introduced to the portion of the heater element with wetting layer. The amount of metallic element is chosen to result in a sufficiently continuous electrical connection and may vary depending upon the configuration of de-icing circuit.

Finally, if step 26 is completed, the metallic element is melted to form the integral electrical connection on the heater element in step 28 (unless a molten metal was used, in which case steps 26-28 are combined). For example, a copper metallic layer may be processed at about 1200° C. for about 15 minutes under argon to create an integral electrical connection. Specific process conditions will depend on the metallic layer, wetting layer, and composition of the heater element. Alternatively, co-firing of the wetting layer and metallic layer can occur, where steps 24 and 28 are done together. In another embodiment, addition of the metallic element can be done by additive manufacturing methods such as direct writing.

The above described method allows for integration of a highly conductive electrical connection onto a carbon allotrope heater element for ice protection. The resulting electrical connection has both a low resistance and good adhesion to the heater element. This allows for a robust junction between a carbon allotrope based heating element and other heating circuitry. The carbon allotrope heater element itself is lightweight, and can be tailored to surfaces needing ice protection. This method reliability creates a bus bar connection to a heating element that is more environmentally durable, lower cost, and can be location specific on the heating element.

DISCUSSION OF POSSIBLE EMBODIMENTS

The following are non-exclusive descriptions of possible embodiments of the present invention.

A method of making conformal coating on a carbon allotrope heater element includes applying a wetting agent to a portion of the carbon allotrope heater element to create a wetting layer, introducing a metallic material onto the portion of the carbon allotrope heater element with the wetting layer, and melting the metallic material such that it wets the portion of the carbon allotrope heater element with the wetting layer.

The method of the preceding paragraph can optionally include, additionally and/or alternatively, any one or more of the following features, configurations and/or additional components:

The carbon allotrope heater element is comprised of a material selected from the group consisting of carbon nanotubes, graphene, graphene nanoribbons, graphite, boron nitride nanotubes, and combinations thereof.

The method includes heat treating the wetting layer on the carbon allotrope heating element.

Heat treating the wetting layer, introducing the metallic material, and melting the metallic material are done simultaneously.

Introducing a metallic material is done by slurry, vapor, or direct writing methods.

The wetting agent is selected from the group consisting of carbides, oxides, nitrides, elemental or alloyed metallic chemistries and combinations thereof.

The metallic material is selected from the group consisting of copper, copper alloys, aluminum, aluminum alloys, nickel, nickel alloys, platinum, platinum alloys, silver, silver alloys, solder alloys, braze alloys, and combinations thereof.

The metallic material is a foil, powder, wire, slurry, solution, or vapor.

Heat treating the wetted carbon allotrope heater element occurs between 50 and 2000 degrees Celsius.

Melting the metallic material occurs between 80 and 2000 degrees Celsius.

Introducing a metallic material to a portion of the carbon allotrope heater element occurs by conversion of a portion of a surface of the carbon allotrope heater element to a carbide.

A carbon allotrope heater element includes a carbon allotrope material, and a metallic coating on a portion of the carbon allotrope material, the metallic coating bonded to the carbon allotrope material by a wetting layer.

The heater element of the preceding paragraph can optionally include, additionally and/or alternatively, any one or more of the following features, configurations and/or additional components:

The carbon allotrope heater element is comprised of a material selected from the group consisting of carbon nanotubes, graphene, graphene nanoribbons, graphite, boron nitride nanotubes, and combinations thereof.

The wetting layer is selected from the group consisting of carbides, oxides, nitrides, elemental or alloyed metallic chemistries and combinations thereof.

The metallic coating is selected from the group consisting of copper, copper alloys, aluminum, aluminum alloys, nickel, nickel alloys, platinum, platinum alloys, silver, silver alloys, solder alloys, braze alloys, and combinations thereof.

The wetting layer is formed by conversion of a portion of the surface of the carbon allotrope material to a carbide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a conformal electrical connection on a carbon allotrope heater element, the method comprising:
    applying a wetting agent to a portion of the carbon allotrope heater element to create a wetting layer, wherein the wetting agent is selected from the group consisting of carbides, oxides, and nitrides and the wetting agent is applied to 5% to 40% of surface area of the carbon allotrope heater element;
    introducing a metallic material onto the wetting layer to form a coated portion of the carbon allotrope heater element;
    melting the metallic material such that the metallic material wets the portion of the carbon allotrope heater element with the wetting layer, wherein the metallic material forms a metallic coating bonded to the carbon allotrope heater by the wetting layer to provide a conductive electrical connection on the carbon allotrope heater element and wherein the carbon allotrope heater element is useful for ice protection; and
    soldering wires to the metallic coating to allow for an electrical connection to the carbon allotrope heater element.

2. The method of claim 1, wherein the carbon allotrope heater element is comprised of a material selected from the group consisting of carbon nanotubes, graphene, graphene nanoribbons, graphite, boron nitride nanotubes, and combinations thereof.

3. The method of claim 1, further comprising heat treating the wetting layer on the carbon allotrope heating element.

4. The method of claim 3, wherein heat treating the wetting layer, introducing the metallic material, and melting the metallic material are done simultaneously.

5. The method of claim 3, wherein heat treating the wetted carbon allotrope heater element occurs between 50 and 2000 degrees Celsius.

6. The method of claim 1, wherein introducing a metallic material is done by slurry, vapor, or direct writing methods.

7. The method of claim 1, wherein the wetting agent is selected from the group consisting of $Mo_2C$, TiC, NiO, $Fe_2O_3$, $Cr_3C_2$ and WC.

8. The method of claim 1, wherein the metallic material is selected from the group consisting of copper, copper alloys, aluminum, aluminum alloys, nickel, nickel alloys, platinum, platinum alloys, silver, silver alloys, solder alloys, braze alloys, and combinations thereof.

9. The method of claim 1, wherein the metallic material is a foil, powder, wire, slurry, solution, or vapor.

10. The method of claim 1, wherein melting the metallic material occurs between 80 and 2000 degrees Celsius.

11. The method of claim 1, wherein introducing a metallic material to a portion of the carbon allotrope heater element occurs by reaction between a chemical precursor and a portion of a surface of the carbon allotrope heater element to form a carbide.

* * * * *